US011599499B1

(12) United States Patent
Schoeffler et al.

(10) Patent No.: US 11,599,499 B1
(45) Date of Patent: *Mar. 7, 2023

(54) THIRD-PARTY INDEXABLE TEXT

(71) Applicant: Google LLC, Mountain View, CA (US)

(72) Inventors: Eric Benson Schoeffler, Boulder, CO (US); Micah Lemonik, Great Neck, NY (US); Michael Jeffrey Procopio, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,748

(22) Filed: Apr. 19, 2021

Related U.S. Application Data

(63) Continuation of application No. 16/043,089, filed on Jul. 23, 2018, now Pat. No. 10,983,956, which is a continuation of application No. 14/982,577, filed on Dec. 29, 2015, now Pat. No. 10,031,920, which is a continuation of application No. 13/453,209, filed on Apr. 23, 2012, now Pat. No. 9,262,420.

(51) Int. Cl.
| | | |
|---|---|---|
| *G06F 16/13* | (2019.01) | |
| *G06F 16/41* | (2019.01) | |
| *G06F 16/958* | (2019.01) | |
| *G06F 16/182* | (2019.01) | |
| *G06F 16/951* | (2019.01) | |
| *G06F 16/14* | (2019.01) | |

(52) U.S. Cl.
CPC ............ *G06F 16/134* (2019.01); *G06F 16/14* (2019.01); *G06F 16/183* (2019.01); *G06F 16/41* (2019.01); *G06F 16/951* (2019.01); *G06F 16/958* (2019.01)

(58) Field of Classification Search
None
See application file for complete search history.

(56) References Cited

U.S. PATENT DOCUMENTS

| | | |
|---|---|---|
| 6,092,114 A | 7/2000 | Shaffer et al. |
| 6,952,714 B2 | 10/2005 | Peart |
| 7,065,588 B2 | 6/2006 | Konda et al. |
| 7,069,502 B2 | 6/2006 | Numata et al. |
| 7,197,510 B2 | 3/2007 | Abe et al. |
| 7,225,204 B2 | 5/2007 | Manley et al. |
| 7,263,688 B2 | 8/2007 | Pitzel et al. |
| 7,613,798 B2 | 11/2009 | Mickeleit |
| 7,680,932 B2 | 3/2010 | Defaix et al. |

(Continued)

FOREIGN PATENT DOCUMENTS

| | | |
|---|---|---|
| KR | 10-2010-0137323 | 12/2010 |
| KR | 10-2012-0010397 | 2/2012 |

(Continued)

OTHER PUBLICATIONS

Bibi et al., "A Platform for Delivering Multimedia Presentations on Cultural Heritage," 2010 14th Panhellenic Conference on Informatics, pp. 175-179.

(Continued)

*Primary Examiner* — Kim T Nguyen
(74) *Attorney, Agent, or Firm* — Lowenstein Sandler LLP (57) ABSTRACT

Techniques are shown for enabling a network system to index data stored on a third-party server to allow the data stored on the third-party server to be searchable by searching functionality of the network system.

20 Claims, 4 Drawing Sheets

(56) References Cited

U.S. PATENT DOCUMENTS

| | | | |
|---|---|---|---|
| 7,689,633 B1 | 3/2010 | Li et al. | |
| 7,707,413 B2 | 4/2010 | Lunt et al. | |
| 7,711,835 B2 | 5/2010 | Braddy et al. | |
| 7,734,914 B1 | 6/2010 | Malasky | |
| 7,735,081 B2 | 6/2010 | Robinson et al. | |
| 7,761,796 B2 | 7/2010 | Faraday et al. | |
| 7,779,113 B1 | 8/2010 | Samar | |
| 7,818,678 B2 | 10/2010 | Massand | |
| 7,818,679 B2 | 10/2010 | Clarke | |
| 7,827,201 B1 | 11/2010 | Gordon et al. | |
| 7,941,419 B2 | 5/2011 | Bhatkar et al. | |
| 7,962,853 B2 | 6/2011 | Bedi et al. | |
| 7,979,416 B1 | 7/2011 | Santry et al. | |
| 7,983,416 B2 | 7/2011 | Takashima et al. | |
| 7,996,380 B2 | 8/2011 | Arrouye et al. | |
| 8,015,496 B1 | 9/2011 | Rogers | |
| 8,079,065 B2 | 12/2011 | Sacson et al. | |
| 8,108,427 B2* | 1/2012 | Prahlad | G06F 21/604 726/27 |
| 8,126,887 B2 | 2/2012 | Polo-Malouvier et al. | |
| 8,131,723 B2 | 3/2012 | Sim-Tang | |
| 8,150,855 B2* | 4/2012 | Chen | G06F 16/217 707/769 |
| 8,151,204 B2 | 4/2012 | Lusen et al. | |
| 8,190,987 B2 | 5/2012 | Campbell et al. | |
| 8,250,455 B2 | 8/2012 | Kadowaki et al. | |
| 8,341,708 B1 | 12/2012 | Eatough et al. | |
| 8,364,759 B2 | 1/2013 | Moromisato et al. | |
| 8,386,478 B2 | 2/2013 | Wang | |
| 8,478,817 B2 | 7/2013 | Duggal | |
| 8,555,160 B2 | 10/2013 | Hattori | |
| 9,262,420 B1* | 2/2016 | Schoeffler | G06F 16/14 |
| 9,930,092 B2* | 3/2018 | Vegesna-Venkata | H04L 67/02 |
| 10,031,920 B1* | 7/2018 | Schoeffler | G06F 16/41 |
| 10,951,681 B2* | 3/2021 | Vegesna-Venkata | H04L 67/146 |
| 10,983,956 B1* | 4/2021 | Schoeffler | G06F 16/14 |
| 2003/0041095 A1 | 2/2003 | Konda et al. | |
| 2003/0126592 A1 | 7/2003 | Mishra et al. | |
| 2004/0030995 A1 | 2/2004 | Bhogal et al. | |
| 2004/0155901 A1 | 8/2004 | McKee et al. | |
| 2004/0205358 A1 | 10/2004 | Erickson | |
| 2005/0200887 A1 | 9/2005 | Bai | |
| 2005/0243760 A1 | 11/2005 | Yoshioka | |
| 2005/0273695 A1 | 12/2005 | Schnurr | |
| 2005/0289538 A1 | 12/2005 | Black-Ziegelbein et al. | |
| 2006/0005168 A1 | 1/2006 | Singh | |
| 2006/0070029 A1 | 3/2006 | Laborczfalvi et al. | |
| 2006/0074837 A1 | 4/2006 | Braddy et al. | |
| 2007/0226535 A1 | 9/2007 | Gokhale | |
| 2007/0254631 A1 | 11/2007 | Spooner | |
| 2008/0172720 A1 | 7/2008 | Botz et al. | |
| 2008/0189361 A1 | 8/2008 | Greschler et al. | |
| 2008/0222517 A1 | 9/2008 | Halim et al. | |
| 2009/0083707 A1 | 3/2009 | Fujita et al. | |
| 2009/0193030 A1 | 7/2009 | Gorsev et al. | |
| 2009/0210721 A1 | 8/2009 | Phillips | |
| 2009/0235352 A1 | 9/2009 | Schrijen et al. | |
| 2009/0249185 A1 | 10/2009 | Datar et al. | |
| 2009/0254580 A1 | 10/2009 | Laurion | |
| 2009/0288135 A1 | 11/2009 | Chang et al. | |
| 2010/0005529 A1 | 1/2010 | Hemade | |
| 2010/0161762 A1 | 6/2010 | Saxena | |
| 2010/0256971 A1* | 10/2010 | Tisserand | G06F 9/45529 703/21 |
| 2010/0257578 A1 | 10/2010 | Shukla et al. | |
| 2010/0274910 A1 | 10/2010 | Ghanaie-Sichanie et al. | |
| 2010/0281528 A1 | 11/2010 | Hayton et al. | |
| 2010/0325155 A1 | 12/2010 | Skinner et al. | |
| 2010/0325199 A1 | 12/2010 | Park et al. | |
| 2011/0066668 A1 | 3/2011 | Guarraci | |
| 2011/0137979 A1 | 6/2011 | Seo et al. | |
| 2011/0154290 A1 | 6/2011 | Kelly | |
| 2011/0179176 A1 | 7/2011 | Ravichandran et al. | |
| 2011/0202672 A1 | 8/2011 | Narayanaswamy et al. | |
| 2011/0209045 A1 | 8/2011 | Ghosh et al. | |
| 2011/0231912 A1 | 9/2011 | Lee | |
| 2011/0247074 A1 | 10/2011 | Manring et al. | |
| 2011/0252038 A1 | 10/2011 | Schmidt et al. | |
| 2011/0296048 A1 | 12/2011 | Knox et al. | |
| 2012/0005159 A1 | 1/2012 | Wang et al. | |
| 2012/0089612 A1* | 4/2012 | Collins | H04N 1/4486 707/E17.049 |
| 2012/0095878 A1 | 4/2012 | Feldman et al. | |
| 2012/0099135 A1 | 4/2012 | Ono | |
| 2012/0110646 A1 | 5/2012 | Ajitomi et al. | |
| 2012/0144202 A1 | 6/2012 | Counterman | |
| 2012/0144454 A1 | 6/2012 | Lee | |
| 2012/0158668 A1 | 6/2012 | Tu et al. | |
| 2012/0173612 A1* | 7/2012 | Vegesna-Venkata | G06F 40/166 709/203 |
| 2012/0254042 A1 | 10/2012 | Ludemann | |
| 2012/0266229 A1 | 10/2012 | Simone et al. | |
| 2012/0278805 A1 | 11/2012 | Shin et al. | |
| 2013/0018904 A1 | 1/2013 | Mankala et al. | |
| 2013/0036455 A1 | 2/2013 | Bodi et al. | |
| 2013/0080268 A1 | 3/2013 | Gordon et al. | |
| 2013/0086585 A1 | 4/2013 | Huang et al. | |
| 2013/0086670 A1 | 4/2013 | Vangpat et al. | |
| 2013/0111336 A1 | 5/2013 | Dorman et al. | |
| 2013/0124606 A1 | 5/2013 | Carpenter et al. | |
| 2013/0144978 A1 | 6/2013 | Jain et al. | |
| 2013/0174237 A1 | 7/2013 | Zises | |
| 2013/0254343 A1 | 9/2013 | Stevens et al. | |
| 2013/0318125 A1 | 11/2013 | Smith et al. | |
| 2014/0082071 A1 | 3/2014 | Rexer | |
| 2014/0114672 A1 | 4/2014 | Wright et al. | |
| 2018/0183854 A1* | 6/2018 | Vegesna-Venkata | H04L 67/146 |
| 2021/0352130 A1* | 11/2021 | Vegesna-Venkata | H04L 67/143 |

FOREIGN PATENT DOCUMENTS

| | | |
|---|---|---|
| KR | 10-2012-0065072 | 6/2012 |
| KR | 10-2013-0007459 | 1/2013 |
| WO | 2001/035211 | 5/2001 |
| WO | 2010/054374 A1 | 5/2010 |

OTHER PUBLICATIONS

DeJean, D., "Online Office Apps Get Real: Google Docs vs. ThinkFree vs. Zoho," Computerworld, Jul. 16, 2008, pp. 1-7.

Ellis et al., "Concurrency Control in Groupware Systems," ACM 1989, pp. 399-407.

http://web.archive.org/web/20120512130530/https://developer.mozilla.org/en/Setting_up_extension_development_environment, 2012, 7 pages.

http://web.archive.org/web/20120819143535/https://addons.mozilla.org/en-US/firefox/extensions/?sort=featured, printed Dec. 13, 2013, 3 pages.

http://web.archive.org/web/20121020134710/https://addons.mozilla.org/en-US/seamonkey/extensions, printed Dec. 13, 2013, 3 pages.

http://web.archive.org/web/20121021135356/http://support.mozilla.org/en-US/kb/find-and-install-add-ons-add-features-to-firefox, printed Dec. 13, 2013, 3 pages.

http://www-archive.mozilla.org/projects/webservices/, snapshot taken Apr. 21, 2008, printed Dec. 13, 2013, 4 pages.

https://addons.mozilla.org/En-us/seamonkey/addon/gmail-smime/?src=search, printed Dec. 13, 2013, 2 pages.

Laferriere et al., "Authentication and Authorization Techniques in Distributed Systems," Security Technology, 1993 Proceedings, Institute of Electrical and Electronics Engineers International Carnahan Conference on Ottawa, Ont., Canada Oct. 13-15, 1993, pp. 164-170.

Lampson et al., "Authentication in Distributed systems: Theory and Practice," ACM Transactions on Computer Systems, Association for Computing Machinery, Inc., vol. 10, No. 4, Nov. 1, 1992, pp. 265-310.

(56) References Cited

OTHER PUBLICATIONS

Nichols et al., "High-Latency, Low-Bandwidth Windowing in the Jupiter Collaboration System," UIST '95. 8th Annual Symposium on User Interface Software and Technology. Proceedings of the ACM Symposium on User Interface Software and Technology, Nov. 14-17, 1995, pp. 111-120.

Peels et al., "Document Architecture and Text Formatting, ACM Transactions on Office Information Systems," 3(4):347-369 (1985).

Symantec Corporation: "E-security begins with sound security policies", Announcement Symantec, section "Who Writes the Policy?," Jun. 14, 2001, pp. 10-11, (entire document 23 pages).

Beresford et al., "MockDroid: Trading Privacy for Application Functionality on Smartphones," HotMobile '11 Mar. 3, 2011, Phoenix, AZ, USA (6 pages).

Nauman et al., "Apex: Extending Android Permission Model and Enforcement with User-Defined Runtime Constraints," ASIACCS '10 Apr. 13-16, 2010 Beijing, China (5 pages).

The Oauth 2.0 Authorization Protocol; draft Ietf-oauth-v2-24; Mar. 8, 2012 (44 pages).

Zhou et al., "Taming Information-Stealing Smartphone Applications (on Android)," LNCS 6740:93-107 (2011) (15 pages).

\* cited by examiner

THIRD-PARTY INDEXABLE TEXT

RELATED APPLICATIONS

This application is a continuation application of co-pending U.S. patent application Ser. No. 16/043,089, filed Jul. 23, 2018, entitled, "THIRD-PARTY INDEXABLE TEXT," which is a continuation application of co-pending U.S. patent application Ser. No. 14/982,577, filed Dec. 29, 2015, entitled, "THIRD-PARTY INDEXABLE TEXT," now U.S. Pat. No. 10,031,920, which is a continuation of U.S. patent application Ser. No. 13/453,209, filed Apr. 23, 2012, entitled, "THIRD-PARTY INDEXABLE TEXT," now U.S. Pat. No. 9,262,420, which is herein incorporated by reference.

BACKGROUND

A need exists to access and use various types of capabilities provided by remote computing systems over the Web. In addition to user-initiated interactions, software programs on remote computing systems may also interact for various purposes and in various ways. For example, there is growing use of the Web to provide so-called "Web services," which typically involve the programmatic interaction of remote applications to exchange information via defined APIs ("application program interfaces"). Web services allow heterogeneous applications and computers to interact, and may be defined and implemented using a variety of underlying protocols and techniques.

While capabilities provided by services over networks to remote users and other clients have various benefits, as the numbers of clients and services increase, it can be difficult for the services to manage access to and location of the computing-related resources.

SUMMARY

Techniques are disclosed to enable a network system to index data stored on a third-party server without having to access the raw data on the third-party server. A "network" system as used herein refers to an online or network system involving client—server architecture with one or more client devices communicatively coupled over one or more networks to one or more remote servers. An access control module determines access control information with the data and communicates the access control information to a third-party server. A metadata receiving module receives one or more of indexable text or indexable html or some combination of indexable text and indexable html, and the access control information as metadata associated with the data stored on a third-party server. An indexing utility processes the metadata at the network system from the third-party server and arranges the metadata on the network system in a manner that is searchable by searching functionality of the network system.

Implementations may include corresponding systems, apparatus, and computer programs, configured to perform the actions of the methods, encoded on computer storage devices. This Summary is not intended to introduce key features or essential features of the claimed subject matter, but merely provides a selection of concepts that are further described in the Detailed Description. Further implementations, features, and advantages, as well as the structure and operation of the various implementations are described in detail below with reference to accompanying drawings.

BRIEF DESCRIPTION OF THE FIGURES

Implementations are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Third-party application developers may want to use a network or online storage system as a backend storage solution. A network or online storage system is understood herein to encompass any remote network system. A network or online storage system may have the ability to index the data produced by third-party application developers and allow users to search over the data. However, in some cases, third-party developers may want to store additional data on their own backend storage servers. In such cases it may be problematic for the network or online storage system to index the data that is stored on the third-party servers because the network or online storage system does not own or have access to that data. Therefore, if a third party stores most of its data on its own servers, or the third party stores its data on the network storage system in a binary, proprietary format, not indexable by the network storage system, it will not be able to reap the benefits of the search functionality provided on the network storage system.

This problem can be extended to any online storage system that allows third parties to read and write data that can be indexed and searched. Third-party applications may be software applications or programs developed by a party other than the owner of the online storage. Third-party servers may be servers owned or controlled by a party other than the owner of the online or network storage system. Third-party applications can also include applications that are on different servers and/or have different access control than the online or network system irrespective of "ownership".

To locate documents on the Internet, users typically use an Internet search engine. Internet users enter one or more key search terms, which may include boolean operators for the search, and transmit the search request to a server including a search engine. The search engine maintains an index of information from web pages on the Internet. This index provides search terms for a particular Web address or Universal Resource Locator (URL). If the index terms for a URL in the search engine database satisfy the Internet user search query, than that URL is returned in response to the query.

Search engine providers need to constantly update their URL database to provide a more accurate and larger universe of potential search results that may be returned to the user. Search engine companies sometimes employ a robot that searches and categorizes Web pages on the basis of metatags and content in the located Hyper-Text Markup Language (HTML) pages. A robot is a program that automatically traverses the Web's hypertext structure by retrieving an HTML page, and then recursively retrieving all documents referenced from the retrieved page. Recursively retrieving all documents referenced from a retrieved page means that the process of retrieving documents is repeated, each time retrieving documents referenced from a retrieved page. Web robots released by search engines to access and index Web pages are referred to as Web crawlers and Web spiders.

Search engines may be provided with a database of indexable terms for URLs generated by robots. However, some of the disadvantages of such robot-generated URL databases are that periodic updates to the URL web site may render the URL database inaccurate and outdated until the robot rechecks a previously indexed page. Search engine robots may be designed to search for HTML pages and parse HTML content into index search terms in the search engine database.

However, many web pages provide content in formats that are not accessible or parseable to search engine robots that are designed to traverse HTML pages, such as content encoded in various multi-media formats, e.g., MPEG, SHOCKWAVE™, ZIP files, etc. Web site content may be dynamic and accessible by providing a search term that is then used by a program, e.g., the Common Gateway Interface (CGI), Java™ programs, Microsoft™ Active Server pages, etc., to query a database and return search results. Such dynamic data accessible through queries may not be identified by search engine robots and indexed in the search engine URL database.

A still further disadvantage is that Web robots have been known to overload web servers and present security hazards. For this reason, many web sites use a firewall that restricts the search engine web robot from accessing and cataloging the content, even when the web site provider would want their information publicly available. Web site providers may also limit a web robot's access to a site by creating a "robot.txt" file that indicates URLs on the site that the robot is not permitted to access and index. Such limitations of search engine web robots may prevent the web robot from accessing relevant web pages that would be of interest to search engine users.

In accordance with various implementations of the present disclosure, some of the above-mentioned problems encountered by search engines when searching across the Web for relevant content are alleviated by storing user data and content on servers belonging to third parties that also provide third-party applications designed to create, open, edit, or otherwise process the types of data files and content stored on their servers. The third-party applications and web site providers can store resources on their own servers and control access to those resources.

However, the third party may also want to use a network system as an additional back-end storage system for the third-party resources, while at the same time controlling how a user might find these resources using the network system's existing indexing strategies. To achieve this end result, the third party may add text or html as metadata or summary data to user resources accessible by that third party and stored on the third-party servers.

These third-party resources may be files, images, data, documents, or other content that is stored on and controlled by servers belonging to a party other than the user or the network or online storage system. "User-accessible" resources, as used herein, encompasses files, images, data, documents, or other content that a particular user created or otherwise has been granted access or control over. A user could store their user-accessible resources on the third-party server belonging to the third party whose application or applications the user employed to create or edit the resources, or on a server or servers belonging to the network storage system.

The indexable metadata or summary data created by the third party may be stored on the third-party server or on the network or online storage system, and indexed by the network or online storage system's indexer. The indexable metadata may have permissions, or access control attributes, similar to the resource it represents in order to prevent private data from becoming public. Once indexed, a user can search for resources that are stored on third-party servers or web site providers by searching for text or html in the indexable text metadata. A User Interface (UI) for the network system can be presented to a user through a web browser or browser extension viewed by the user on a client device. To keep things simple, avoid clutter on the web browser, and avoid confusing a user, the indexable metadata stored on the network or online storage system can remain hidden from the user on the UI.

In order to create the indexable text the third party needs to provide a mechanism for converting their data model into indexable text, indexable html, or some combination of indexable text and indexable html. At the point when a user saves data to the third-party servers, the third party can then make an application programming interface (API) call to the API for the online storage system and add that indexable text to the resource metadata or summary data stored on the online storage system. The online storage system includes indexers for most resources that are likely to be stored on the online storage system, including portable document format (PDF) documents, Microsoft™ Word documents, ZIP files, images, videos, etc. The online storage system also employs indexing and searching functionality that allows for the organization and retrieval of the various resources that are stored on the online storage system.

The online storage system does not have to be concerned with how the data on a third-party server is stored. Rather, implementations of the present disclosure are directed to indexing text or hyper-text markup language (HTML) that is provided by the third party as representative and indexable metadata or summary data corresponding to the raw data stored on the third-party server, or, in some alternatives, in a proprietary binary format on the online storage system. The text or HTML metadata provided by the third party can be created by the third party using whatever techniques the third party desires. But it is advantageous to the third party and to users of the third-party storage systems to create useful indexes on the data that is stored on the third-party servers so that a user will be able to find their data on the third-party servers. Alternatives to indexing as text or HTML could include indexing as extensible markup language (XML), as Javascript, etc.

The third party creating the indexable text for the data stored on their server or servers, or on the online storage system, can allow the distinct setting of indexable text as either plain text or as html. As plain text, the text may be parsed by word in order to do the indexing. As html, the text may be parsed as html, paying special attention to html tags, and indexing them based on those tags. In one example, a third party may have a word processing document stored on the third-party server, with the document saved on the third-party server in rich text, which includes data on how to style the text, formatting instructions, etc.

For the purposes of providing indexable text to facilitate searching of this saved document, the third party may take the larger data model of the rich text document and shrink it down to a simple text representation of what is in the larger data model. The third party could then provide this simple text representation as the searchable and indexable metadata to store on the network storage system. The network storage system may put a limit on how much of this indexable metadata a third party may store on the network storage system. This limit could be imposed for various reasons including preventing abuse of the network storage system, and avoiding any detrimental interference with the network storage system's ability to index data obtained from other third parties or from applications already included as part of the network system.

As one example, the amount of indexable metadata a third party may store on the network storage system may be limited to two megabytes (2 MB). Another example of a limit that may be imposed on the amount of indexable metadata could be 128 kilobytes. Yet another example of a limit that may be imposed on the amount of indexable metadata a third party may store on the network system could be 10 MB. Still further non-limiting examples of limits imposed on the amount of indexable metadata a third party may store on the network system could be a range of 1-100 MB, or a range of 128 kilobytes-10 MB, or a range of 2-10 MB, or a range of 2-5 MB.

Through the use of the web, individuals have access to millions of pages of information. At times it can be difficult for users to locate the particular pages that contain the information that is of interest to them. To address this problem, search engines have been developed to index a large number of web pages and to provide an interface that can be used to search the indexed information by entering certain words or phrases to be queried. These search terms are often referred to as "keywords".

Indexes used by search engines are conceptually similar to the normal indexes that are typically found at the end of a book, in that both kinds of indexes comprise an ordered list of information accompanied with the location of the information. An "index word" or "index word set" of a document is the word or set of words that are mapped to the document, in an index. For example, an index word set of a web page is the set of words that are mapped to the web page, in an index. For documents that are not indexed, the index word set is empty.

Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate web documents around the world. Upon locating a document, the crawler stores the document and the document's URL, and follows any hyperlinks associated with the document to locate other web documents. Feature extraction engines then process the crawled and locally stored documents to extract structured information from the documents. In response to a search query, some structured information that satisfies the query (or documents that contain the information that satisfies the query) is usually displayed to the user along with a link pointing to the source of that information. For example, search results typically display a small portion of the page content and have a link pointing to the original page containing that information.

Each search engine contains an indexing mechanism that indexes certain information about the documents that were located by the crawler. In general, index information is generated based on the contents of the HTML file associated with the document. The indexing mechanism stores the index information in large databases that can typically hold an enormous amount of information. Third, each search engine provides a search tool that allows users, through a user interface, to search the databases in order to locate specific documents, and their location on the web (e.g., a URL), that contain information that is of interest to them.

The search engine interface allows users to specify their search criteria (e.g., keywords) and, after performing a search, provides an interface for displaying the search results. Typically, the search engine orders the search results prior to presenting the search results interface to the user. The order usually takes the form of a "ranking", where the document with the highest ranking is the document considered most likely to satisfy the interest reflected in the search criteria specified by the user. Once the matching documents have been determined, and the display order of those documents has been determined, the search engine sends to the user that issued the search a "search results page" that presents information about the matching documents in the selected display order.

The network or online system may limit the amount of text that a third party can save on the online system to avoid abuse of the online system by third parties. The online system may also prevent third parties from modifying indexable text on resources that are not explicitly owned by that particular third-party application alone. This implementation prevents third parties from either interfering with each other's indexable text, or interfering with the online system's ability to index standard blobs (images, pdfs, etc.)

A user will be on a resource access control list (ACL) for the specific resource created or edited by the user with the functionalities of a third-party application. If the user later choses a different third-party application as the application the user would like to employ for performing various functionalities on a particular resource, the user will decide whether to install that third-party application.

Third-party applications are granted access to the resources on the online storage system based on user actions and processes that provide the third-party applications with the correct security authentication. An application that has been granted access to a resource can be used to open, create, modify, or perform other functionalities on that resource. Therefore, once a third-party application has been selected by a user for the creation or modification of a resource that is stored on the third-party servers, that third-party application will be on the resource-specific and user-specific ACLs necessary to give that user and that third-party application permission to provide the indexable metadata representing the resource to the online storage system.

Third-party applications are software applications or programs developed by a party other than the user of the online storage system or the owner of the online storage system. Third-party servers are servers owned or controlled by a party other than the user of the online storage system or the owner of the online or network storage system. Security tokens may be granted to user-authorized third-party applications, and include the user ID, the application ID, and the scope of the resources to which access is granted. A security token is an authentication security device that may be used to authorize the use of computer services by a particular party with regard to a defined resource, and under certain constraints. The scope of access granted by an access token in various implementations of the disclosure is all documents, files, data, or other content, which the user has already opened or created with the third-party application.

A third-party application may only be granted access to a particular user-accessible resource stored on the network or online system when several different checking utilities have made individual determinations that taken together result in authentication fulfillment and granting of access to the third-party application. One requirement for a third-party application to have access to particular user resources is that the user has actually installed the third-party application.

When a user has decided to grant a third-party application access to a user-accessible resource, the user clicks on "accept" or some other similar icon or tab at the URL provided by the third-party application. This action by the user initiates procedures for granting the third-party application access to the user's resource. A decision by the user to accept the parameters detailed on a security page associated with a third-party application results in the user "installing" the application. The network system records this installation in an install record. The installation can be done by any of different procedures that include installing directly from a web store, using a uniform resource locator (URL) provided by the third-party developer, by opening a shared document, or other methods. The act of "installing" the third-party application constitutes registering a relationship between a user's web presence and the third-party application, and acts as a step toward allowing the third-party application to access the user's resources on the network storage system. Even if the user's resources are stored on the third-party servers, the user's actions of installing the third-party application ensures that a search of indexable metadata on the online system will turn up resources that are owned by the user and stored on third-party servers.

Figure 1:
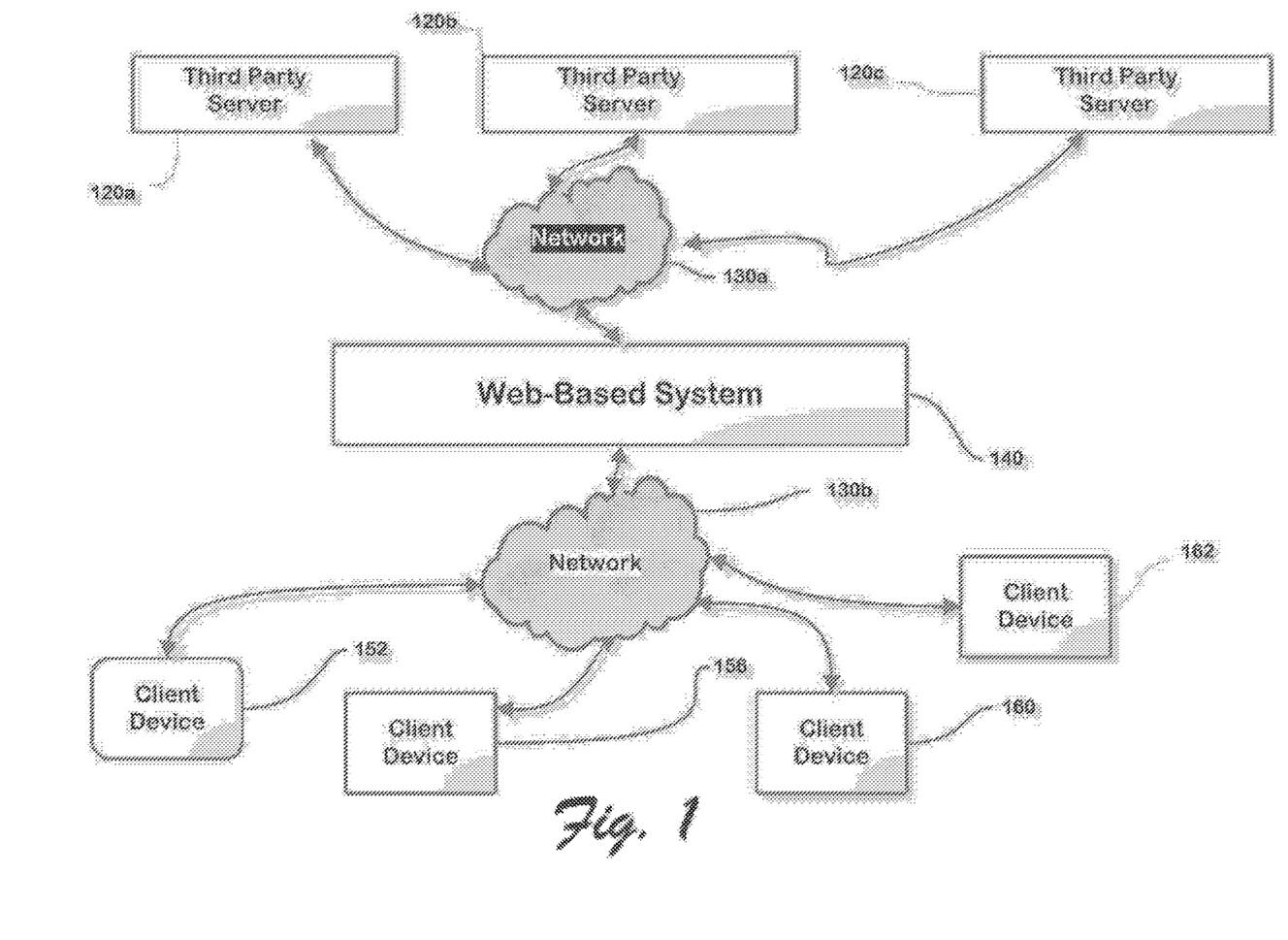
FIG. 1 is a schematic diagram of a system in accordance with one or more implementations of the disclosure.

Referring to FIG. 1, a plurality of third-party servers 120a, 120b, and 120c, are shown communicatively coupled over a network 130a to a network or online storage system 140. Client devices 152, 156, 160, and 162 are also communicatively coupled over a network 130b to the network system 140. The networks 222 in FIG. 2, and 130a and 130b in FIG. 1 may be the Internet, or any other network, including but not limited to a LAN, a MAN, a WAN, a mobile wired or wireless network, a private network, or a virtual private network.

Example Implementation

Figure 2:
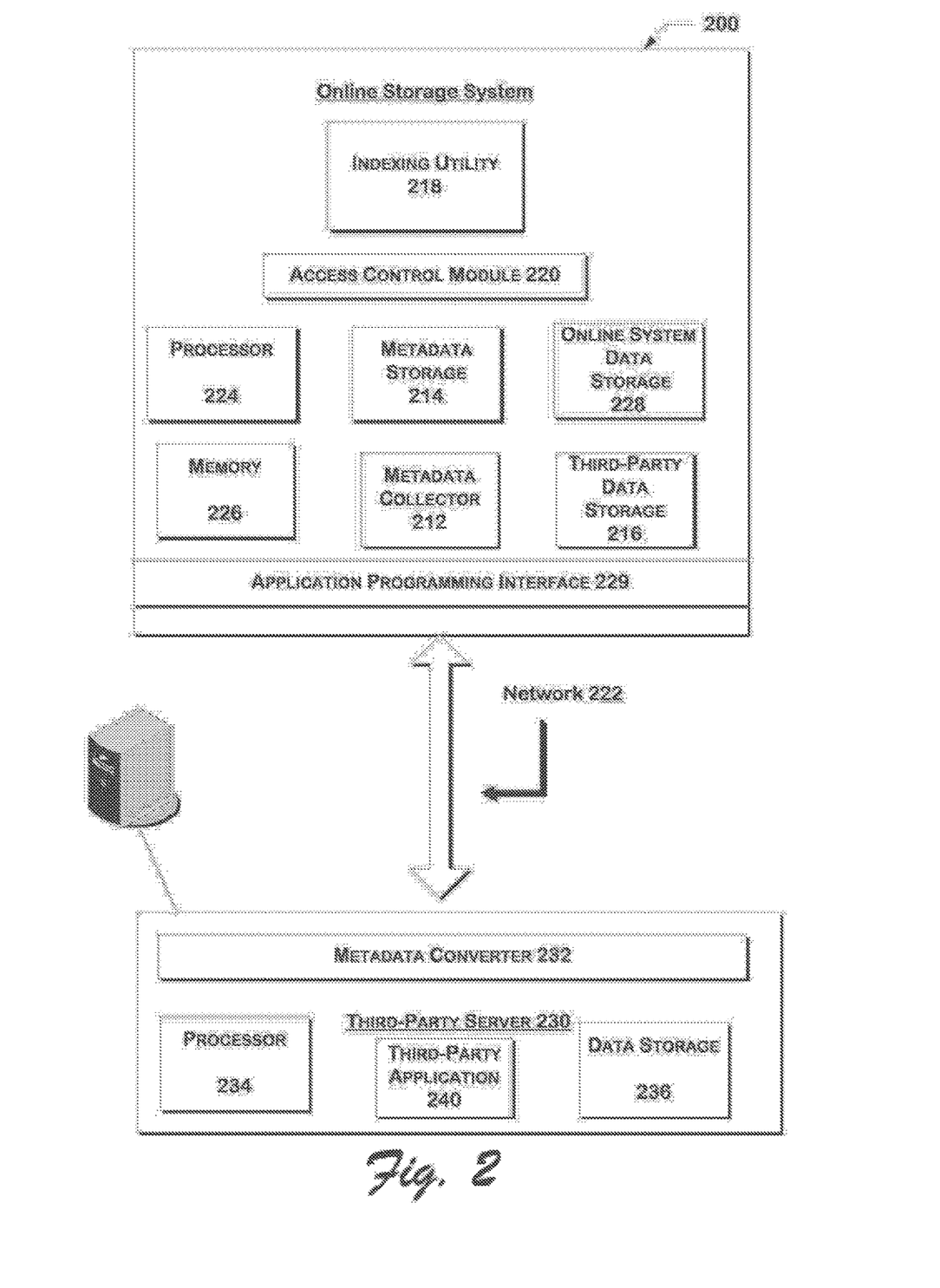
FIG. 2 is a block diagram illustrating features in accordance with an implementation of the disclosure.

Referring to FIG. 2, an online storage system 200 is shown, in one example implementation of the disclosure, communicatively coupled over a network 222 to a third-party server 230. The third-party server 230 includes a processor 234, data storage 236, one or more third-party applications 240, and a metadata converter 232. The online storage system 200 includes an application programming interface (API) 229, a processor 224, memory 226, a metadata collector 212, metadata storage 214, online system data storage 228, third-party data storage 216, an access control module 220, and an indexing utility 218.

The third-party server 230 communicates with the online storage system 200 through the application programming interface (API) 229. A user may store data they have created using a third-party application 240, such as files, images, or other content, on data storage 236 of the third-party server 230. Because this data is stored on the third-party server 230, indexing and searching functionality of the online storage system 200 would not have access to this data in its original form. Metadata converter 232 and processor 234 of the third-party server 230 can apply whatever indexing strategies the third party wants to implement to create indexable text, indexable hypertext markup language (HTML), or a combination of indexable text and indexable HTML. The third party is motivated to apply indexing strategies that create useful indexable metadata in order to facilitate access, increase the number of hits, etc., to the data stored on the third-party server.

Once the indexable metadata representative of the raw data stored on the third-party server 230 has been created by the metadata converter 232, this indexable metadata is sent over the network 222 to the network or online system 200. One or more third-party applications 240 running on the third-party server 230 may communicate with the network or online storage system 200 by calling API 229. In alternative implementations, third-party applications that are granted access to the online storage system 200 through access control module 220 could store their raw data on third-party data storage 216 of network storage system 200, and also provide the indexable metadata for that raw data to the online storage system, or manage the storage of their raw data on the third-party server 230, and only send the indexable metadata to the online storage system. The raw data created by the third-party applications and stored on third-party data storage 216 of network storage system 200 could be in any arbitrary or proprietary, binary format, which in its original form might not be indexable and searchable by the online storage system. But because the third-party application also provides indexable metadata for that raw data, the online storage system can apply its standard indexing and searching functionality to this indexable metadata. In either scenario, the third-party applications run on their own server or server stacks, and the network or online system implements its own security protocols through access control module 220 to control access by the third-party applications to resources stored on the network system.

Indexable metadata representative of raw data stored on the third-party server 230 can be sent to the online storage system 200 through API 229, collected by metadata collector 212, and stored on metadata storage 214. Metadata storage 214 can be separate from or combined with data storage 228 of the online system 200. The metadata provided by the third-party applications to facilitate indexing and searching of raw data stored on the third-party server is now indexable using the indexing utility 218 of the online storage system 200. This feature makes it possible for a user to find data that is stored on the third-party server 230 using searching capabilities and functionalities of the online storage system 200.

As another alternative implementation, techniques in accordance with this disclosure allow one or more third parties to set indexable text on the same object or set of data stored on the online storage system. In this implementation, raw data created by one or more third-party applications may be stored on a third-party data storage 216 of the network or online storage system 200, rather than being stored on the third-party server. The raw data stored by the one or more third-party applications can be stored separately from, or combined with data stored by the online storage system in online system data storage 228. Indexable text or metadata created by the one or more third-party applications may be stored in metadata storage 214, separately from the indexable text created by the online storage system. In this implementation the one or more third parties can add indexable text or metadata to raw data stored on the online storage system, without interfering with the indexing mechanisms of the online storage system.

The total amount of indexable text allotted to third parties may be set at a capped value to keep stored data to a minimum. In one implementation, all third parties of a group of third parties can share a capped amount of storage on the online system for indexable text. In this scenario, if any third party of the group of third parties sets the indexable text for any particular object or set of data, the latest indexable text will overwrite the indexable text of the last third party to add indexable text to that data. The change to the data that results in a third party creating new indexable text also renders the old indexable text obsolete. Therefore, since the data has changed, it makes sense to clear old indexable text and replace it every time a third party creates and stores the new indexable text.

In another implementation, the online system can be configured so that if one third party of a group of third parties sets indexable text for a particular object or set of data, and another third party of that group modifies the content in that set of data, the indexable text can be cleared even if new indexable text is not created and stored in the metadata storage. This feature prevents the retention of old, stale, indexable text after the content that is being indexed has been modified.

Another Example Implementation

A third-party application may allow users to create and edit presentation slides. These slides may be stored on one or more servers belonging to the third party developer. However, the third-party application may want the users to be able to organize and open presentations from the network or online storage system. The third-party application can create a metadata converter that converts the binary representation of their slides into simple HTML containing the text from the slides. Every time a user saves a slide, they can run this converter and save indexable HTML metadata corresponding to the new slide into the stored metadata for the presentation resource on the network storage system. The network storage system 200 can be provided with an indexing utility 218 that will index the HTML provided by the third-party application. Users can search for slides they have made with the third-party application from a User Interface (UI) of the network storage system 200.

Figure 3:
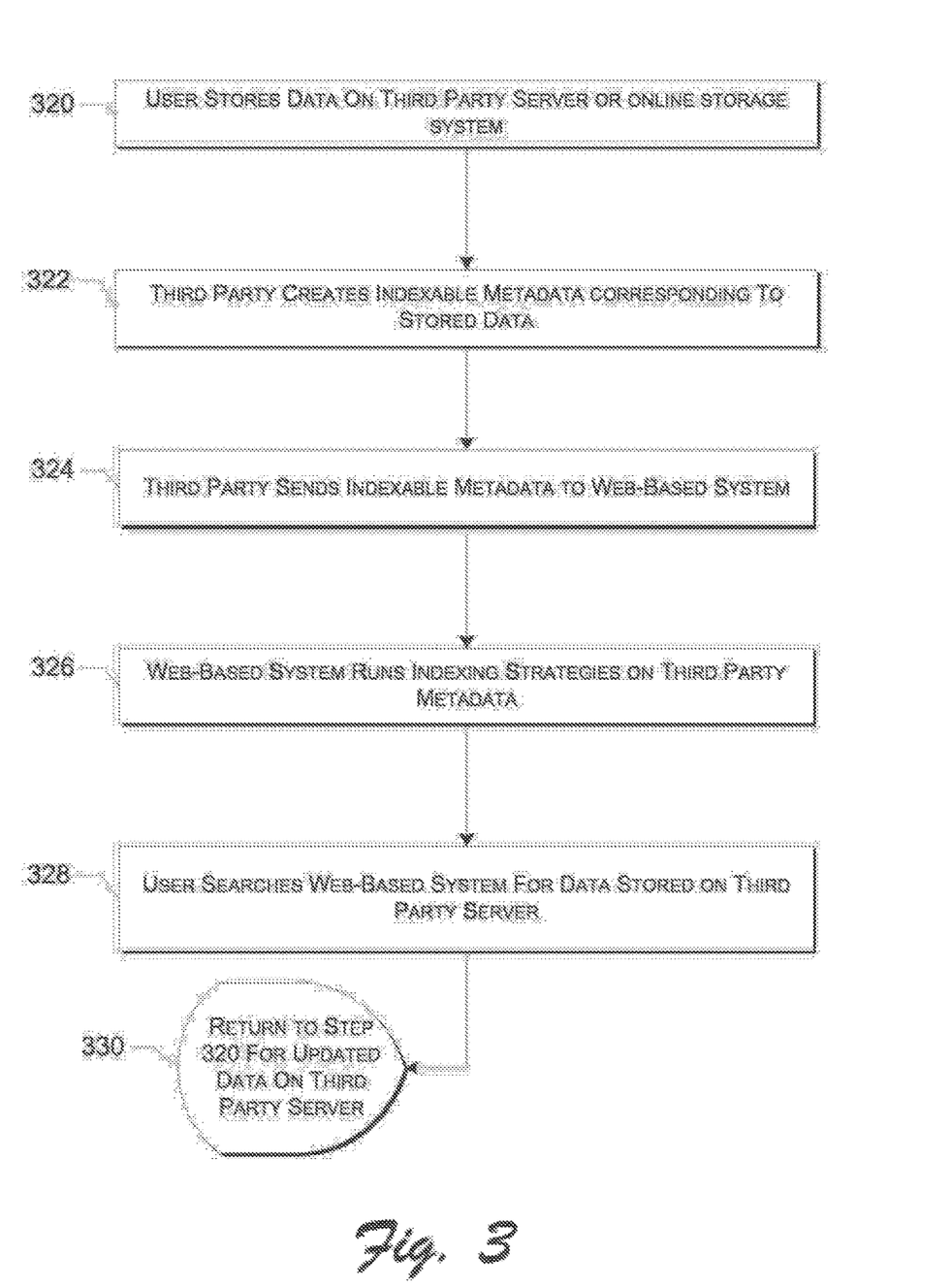
FIG. 3 is a flow chart of techniques employed in accordance with one or more implementations of the disclosure.

Referring to FIG. 3, techniques employed in one implementation of the disclosure include a method 300 wherein a user stores data created using a third-party application on a third-party server at 320. At 322 the third party creates indexable metadata corresponding to the data stored at 320. At 324 the third party sends this indexable metadata to the network system. At 326 the network system runs indexing strategies on the third-party metadata. At 328 the user searches the network system for data that is stored on the third-party server by using the network system's indexing and searching functionalities to search the third-party metadata stored on the network storage system. At 330 an update to data stored on the third-party server can result in the return to 320 and a repeat of steps 320, 322, 324, 326, and 328.

Implementations of the present disclosure can be carried out on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform. Therefore, one or more of the above-described utilities, modules, or other functionalities may be embodied on a third-party server, one or more servers of the online system 100, or some combination thereof.

A processor such as processor 124 of online storage system 100, or processor 134 of third-party server 130, may be any kind of computational or processing device capable of executing program instructions, codes, binary instructions and the like. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

Figure 4:
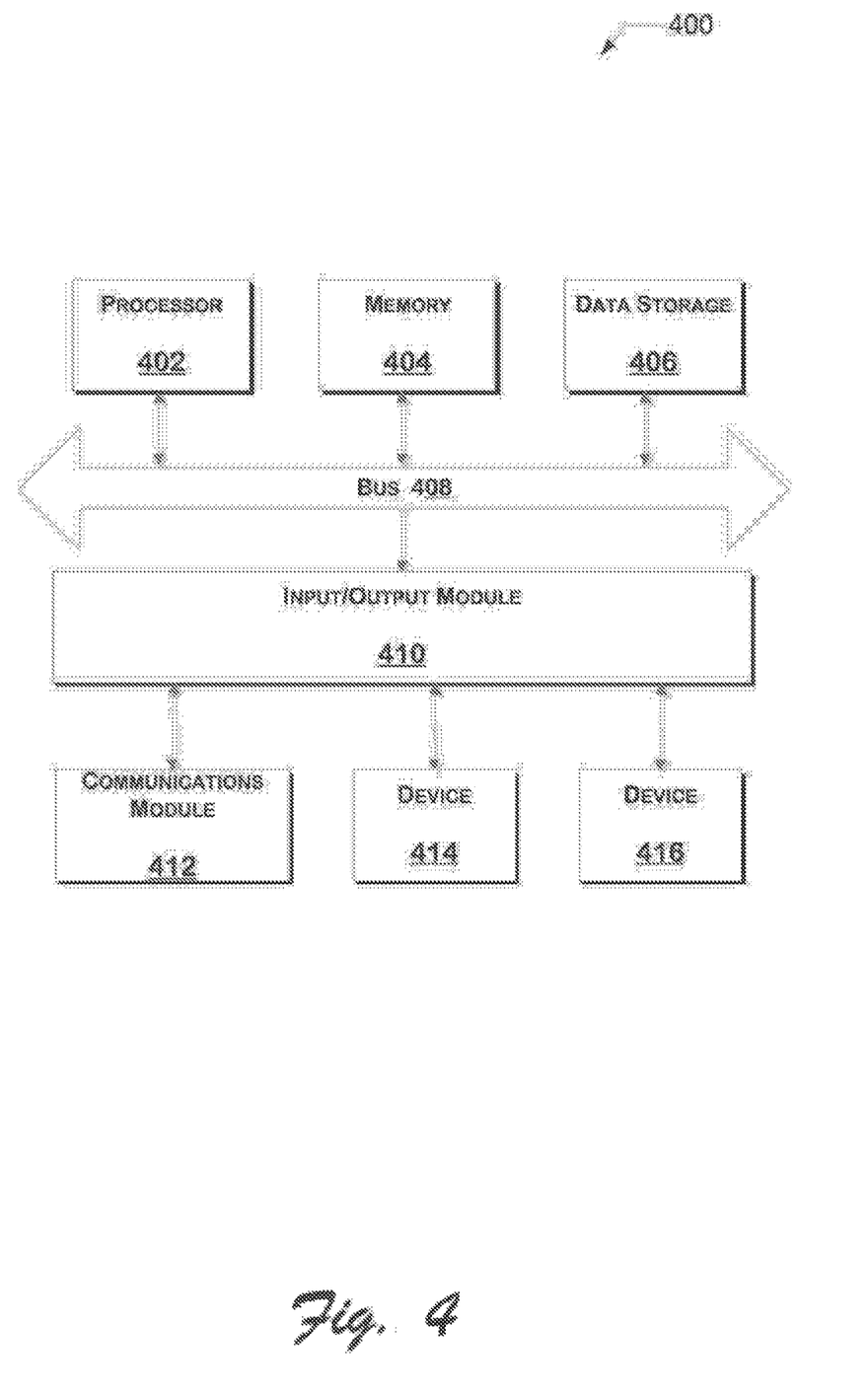
FIG. 4 is a schematic diagram of an exemplary computer system employed in accordance with one or more implementations of the disclosure.

FIG. 4 is a block diagram illustrating an exemplary computer system 400 with which a network or online system 100 of FIG. 1 can be implemented. In certain aspects, the computer system 400 may be implemented using hardware or a combination of software and hardware, either in a dedicated server, or integrated into another entity, or distributed across multiple entities.

Computer system 400 includes a bus 408 or other communication mechanism for communicating information, and a processor 402 coupled with bus 408 for processing information. By way of example, the computer system 400 may be implemented with one or more processors 402.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

A software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of the program across the network. The networking of some or all of these devices may facilitate parallel processing of a program or method at one or more location without deviating from the scope of the disclosed subject matter. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Examples of machines on which the elements described herein may be implemented may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Exemplary input/output modules 410 include data ports such as USB ports. The input/output module 410 is configured to connect to a communications module 412. Exemplary communications modules 412 include networking interface cards, such as Ethernet cards and modems. In certain aspects, the input/output module 410 is configured to connect to a plurality of devices, such as an input device 414 and/or an output device 416. Exemplary input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 416 include display devices, such as a CRT (cathode ray tube) or LCD (liquid crystal display) monitor, for displaying information to the user.

According to one aspect of the present disclosure, the network system 100, as shown in FIG. 1, can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments or implementations can also be implemented in combination in a single embodiment or implementation. Conversely, various features that are described in the context of a single embodiment or implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A network system comprising:
a data storage device; and
a processor, coupled to the data storage device, to:
maintain data searchable by a search component of the network system, the searchable data comprising data pertaining to a first plurality of files provided to the network system by a plurality of users over a network and having one or more formats, wherein the data pertaining to the first plurality of files is indexed and the searchable data allows the first plurality of files to be accessible by the plurality of users over the network;
receive an indication of a user-accessible resource associated with a third-party system, the third-party system being separate from the network system, the user-accessible resource corresponding to a second plurality of files, which differ from the first plurality of files and have one or more formats that are different from the one or more formats of the first plurality of files;
receive, from the third-party system via an application programming interface (API), indexable metadata associated with at least a portion of content of the user-accessible resource; and
arrange the indexable metadata on the data storage device to cause data pertaining to the user-accessible resource to be included in the searchable data searchable by the search component of the network system.

2. The network system of claim 1, wherein the indexable metadata is associated with user-accessible resource access control information that is different than access control information for the network system.

3. The network system of claim 2, wherein the processor is further to record a relationship between the user-accessible resource access control information and the user-accessible resource, the user-accessible resource access control information comprising one or more of a record that a user is on an access control list for the user-accessible resource, or a record that a particular third-party application is on an access control list for the user-accessible resource, or a record that the user has installed the particular third-party application.

4. The network system of claim 1, wherein the second plurality of files are in the one or more formats that are proprietary to the third-party system and are not searchable by the search component of the network system.

5. The network system of claim 1, wherein the indexable metadata associated with the at least a portion of the content of the user-accessible resource comprises a description of the at least a portion of the content of the user-accessible resource.

6. The network system of claim 1, wherein the processor is further to limit an amount of metadata accepted from the third-party system by verifying that an amount of the indexable metadata received from the third-party system satisfies a threshold amount indicative of a maximum amount of indexable metadata to be stored on the network system.

7. The network system of claim 1, wherein the processor is further to:
receive indexable metadata from a plurality of different third-party systems; and store the indexable metadata received from the plurality of different third-party systems in third-party data storage that is separate from storage for data created by the network system.

8. The network system of claim 7, wherein the indexable metadata received from the plurality of different third-party systems is generated by a plurality of third-party applications that are each hosted by one of the plurality of different third-party systems.

9. A method comprising:
maintaining, by a network system, data searchable by a search component of the network system, the searchable data comprising data pertaining to a first plurality of files provided to the network system by a plurality of users over a network and having one or more formats, wherein the data pertaining to the first plurality of files is indexed and the searchable data allows the first plurality of files to be accessible by the plurality of users over the network;
receiving, by the network system, an indication of a user-accessible resource associated with a third-party system, the third-party system being separate from the network system, the user-accessible resource corresponding to a second plurality of files, which differ from the first plurality of files and have one or more formats that are different from the one or more formats of the first plurality of files;
receiving, from the third-party system via an application programming interface (API), indexable metadata associated with at least a portion of content of the user-accessible resource; and
arranging the indexable metadata on the data storage device to cause data pertaining to the user-accessible resource to be included in the searchable data searchable by the search component of the network system.

10. The method of claim 9, wherein the indexable metadata is associated with user-accessible resource access control information that is different than access control information for the network system.

11. The method of claim 10, further comprising:
recording a relationship between the user-accessible resource access control information and the user-accessible resource, the user-accessible resource access control information comprising one or more of a record that a user is on an access control list for the user-accessible resource, or a record that a particular third-party application is on an access control list for the user-accessible resource, or a record that the user has installed the particular third-party application.

12. The method of claim 9, wherein the second plurality of files are in the one or more formats that are proprietary to the third-party system and are not searchable by the search component of the network system.

13. The method of claim 9, wherein the indexable metadata associated with the at least a portion of the content of the user-accessible resource comprises a description of the at least a portion of the content of the user-accessible resource.

14. The method of claim 9, further comprising:
limiting an amount of metadata accepted from the third-party system by verifying that an amount of the indexable metadata received from the third-party system satisfies a threshold amount indicative of a maximum amount of indexable metadata to be stored on the network system.

15. A non-transitory computer-readable medium comprising instructions, which when executed by a processor, cause the processor to perform operations comprising:
maintaining, by a network system, data searchable by a search component of the network system, the searchable data comprising data pertaining to a first plurality of files provided to the network system by a plurality of users over a network and having one or more formats, wherein the data pertaining to the first plurality of files is indexed and the searchable data allows the first plurality of files to be accessible by the plurality of users over the network;
receiving, by the network system, an indication of a user-accessible resource associated with a third-party system, the third-party system being separate from the network system, the user-accessible resource corresponding to a second plurality of files, which differ from the first plurality of files and have one or more formats that are different from the one or more formats of the first plurality of files;
receiving, from the third-party system via an application programming interface (API), indexable metadata associated with at least a portion of content of the user-accessible resource; and
arranging the indexable metadata on the data storage device to cause data pertaining to the user-accessible resource to be included in the searchable data searchable by the search component of the network system.

16. The non-transitory computer-readable medium of claim 15, wherein the indexable metadata is associated with user-accessible resource access control information that is different than access control information for the network system.

17. The non-transitory computer-readable medium of claim 16, wherein the operations further comprise:
recording a relationship between the user-accessible resource access control information and the user-accessible resource, the user-accessible resource access control information comprising one or more of a record that a user is on an access control list for the user-accessible resource, or a record that a particular third-party application is on an access control list for the user-accessible resource, or a record that the user has installed the particular third-party application.

18. The non-transitory computer-readable medium of claim 15, wherein the second plurality of files are in the one or more formats that are proprietary to the third-party system and are not searchable by the search component of the network system.

19. The non-transitory computer-readable medium of claim 15, wherein the indexable metadata associated with the at least a portion of the content of the user-accessible resource comprises a description of the at least a portion of the content of the user-accessible resource.

20. The non-transitory computer-readable medium of claim 15, wherein the operations further comprise:
limiting an amount of metadata accepted from the third-party system by verifying that an amount of the indexable metadata received from the third-party system satisfies a threshold amount indicative of a maximum amount of indexable metadata to be stored on the network system.

* * * * *